United States Patent [19]
Monier

[11] Patent Number: 5,987,489
[45] Date of Patent: Nov. 16, 1999

[54] MODULAR ARITHMETIC COPROCESSOR ENABLING THE PERFORMANCE OF NON-MODULAR OPERATIONS AT HIGH SPEED

[75] Inventor: Guy Monier, Rognac, France

[73] Assignee: SGS-Thomson Microelectronics S.A., Saint Genis, France

[21] Appl. No.: 08/806,456

[22] Filed: Feb. 26, 1997

[30] Foreign Application Priority Data

Mar. 1, 1996 [FR] France ................................. 96 02843
Apr. 30, 1996 [FR] France ................................. 96 05668

[51] Int. Cl.$^6$ ............................... G06F 7/38; G06F 7/00
[52] U.S. Cl. ................................... 708/523; 708/492
[58] Field of Search ......................... 364/746.1, 736.02, 364/736.03; 708/492, 523, 520

[56] References Cited

U.S. PATENT DOCUMENTS

| | | | |
|---|---|---|---|
| 4,852,037 | 7/1989 | Aoki ................................. | 364/736.02 |
| 4,945,506 | 7/1990 | Baji et al ........................... | 364/736.03 |
| 4,949,292 | 8/1990 | Hoshino et al .................... | 364/736.03 |
| 5,101,431 | 3/1992 | Even ................................. | 364/746.1 |
| 5,285,403 | 2/1994 | Quisquater et al. ............... | 364/736.02 |
| 5,424,969 | 6/1995 | Yamada et al. .................... | 364/736.02 |
| 5,457,804 | 10/1995 | Ohtomo ............................. | 364/736.02 |
| 5,657,262 | 8/1997 | Curtet ................................ | 364/736.02 |

FOREIGN PATENT DOCUMENTS

0 601 907  6/1994  European Pat. Off. .......... G06F 7/72

Primary Examiner—Tan V. Mai
Attorney, Agent, or Firm—Wolf, Greenfield & Sacks, P.C.

[57] ABSTRACT

Disclosed is a device including three registers, one input terminal to receive pieces of binary data to be stored in these registers, a multiplication circuit enabling the performance of a multiplication operation between two pieces of data stored in two of the registers, a first addition circuit enabling the performance of an addition operation between a piece of data stored in the second register and a piece of data produced by the multiplication circuit, a subtraction circuit placed between the second register and the addition circuit, a delay cell and a second addition circuit placed between the first addition circuit and the input of the second register, multiplexing circuitry making it possible to provide the contents of the second register or a permanent logic state to one input of one of the addition circuits, to connect another input of the addition circuit to an output of the multiplication circuit and to connect an output of the addition circuit to an input of the second register.

32 Claims, 5 Drawing Sheets

FIG_1 (PRIOR ART)

FIG_2

FIG_3

MODULAR ARITHMETIC COPROCESSOR ENABLING THE PERFORMANCE OF NON-MODULAR OPERATIONS AT HIGH SPEED

BACKGROUND OF THE INVENTION

1. Field of the Invention

The invention relates to a modular arithmetic coprocessor able to perform non-modular operations at high speed. More specifically, the invention relates an improved arithmetic coprocessor enabling the performance of modular operations according to the Montgomery method in order to extend the possibilities of such a coprocessor. The Montgomery method enables the performance of modular computations in a finite field (or Galois field) denoted $GF(2^n)$ without the performance of divisions.

2. Discussion of the Related Art

Conventionally, modular operations on $GF(2^n)$ are used in cryptography for applications such as the authentication of messages, the identification of a user and the exchange of keys. Such exemplary applications are described for example in a document hereinafter referred to as D1 consisting of a French patent application published under No. 2 679 054.

There are commercially available integrated circuits dedicated to such applications. These include, for example the circuit manufactured by SGS-THOMSON MICROELECTRONICS S.A. and referenced ST16CF54, built around an association of the type including a central processing unit and an arithmetic coprocessor dedicated to the performance of modular computations. The coprocessor used enables the processing of the modular operations by the use of the Montgomery method. It is the object of a European patent application filed under the reference No. 0 601 907 A2, hereinafter called the document D2. This coprocessor is illustrated in FIG. 1 (this figure corresponds to FIG. 2 of the document D2).

The basic operation (called a $P_{field}$ operation) consists of the production, on the basis of three pieces of binary data A (multiplicand), B (multiplier) and N (modulo) encoded on an integer n of bits, of a piece of binary data denoted $P_{field}(A, B)_N$ encoded on n bits, such that $P_{field}(A, B)_N = A*B*I \bmod N$. I is a piece of binary data called an error and encoded on n bits such that $I = 2^{-n} \bmod N$ (more specifically, the value of I depends on the number of blocks of k bits, with k as an integer, considered for the encoding of A). To carry out the operation $A*B*I \bmod N$, it is assumed that the pieces of data are encoded on m words of k bits (m and k being whole numbers), with $m*k=n$. The words of the pieces of data A and B are given to a multiplication circuit 19 having a series input to receive B, a parallel input to receive the blocks of k bits of A, and a series output.

In the coprocessor described in the document D2, k=32 and m=8 or 16. This circuit may be used to produce the result of the modular multiplication $A*B \bmod N$. The modular multiplication can be broken down into two successive Pfield elementary operations. $P_{field}(P_{field}(A,B)_N, H)_N$, is computed with H as a piece of data encoded on n bits, called an error correction parameter, and equal to $2^{2n} \bmod N$. For further details on the implementation of modular multiplication, reference may be made to document D2. Several possibilities of computation are already known. They consist in using either a software method or a specialized circuit such as the one illustrated in document D2.

Figure 1:
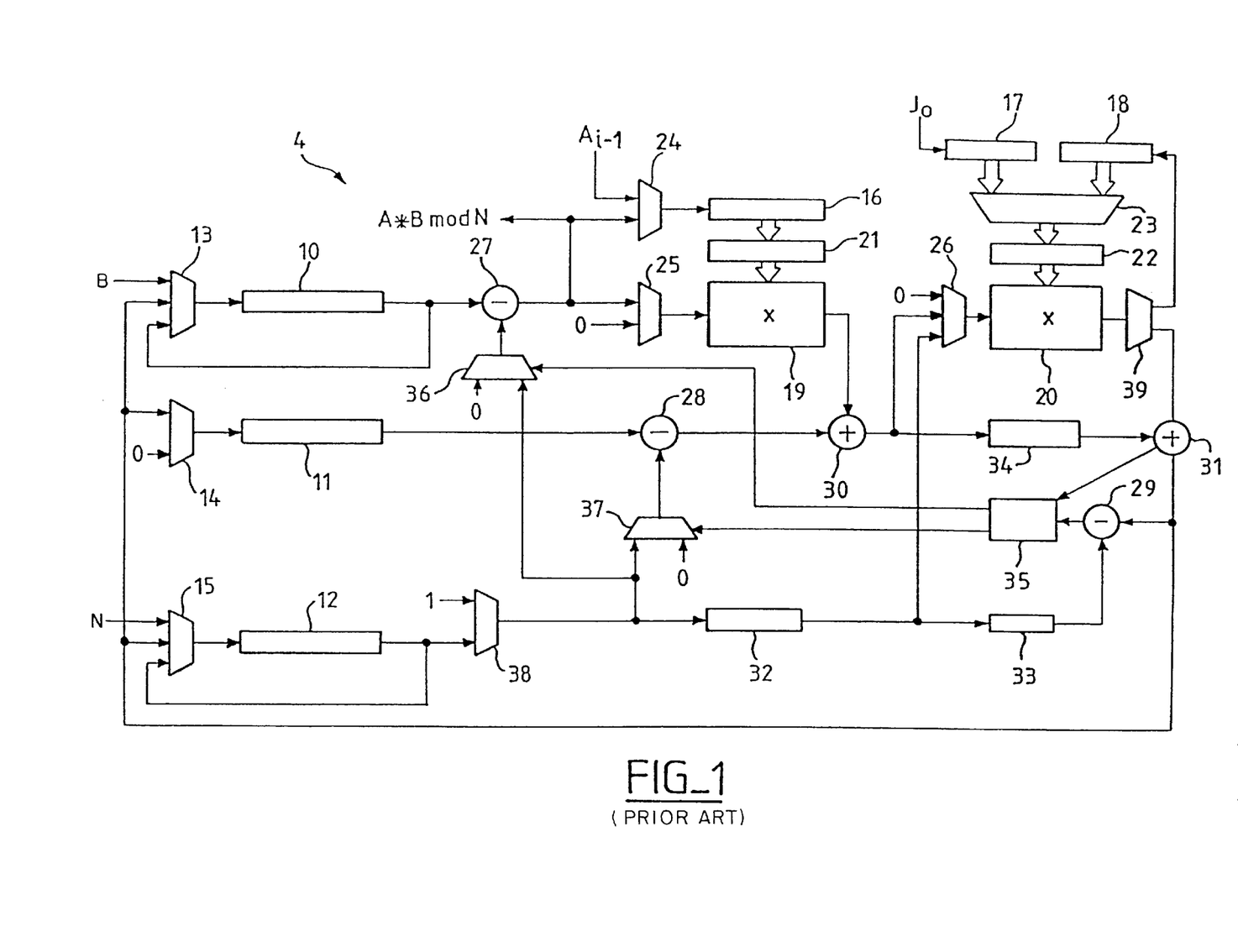
FIG. 1 shows a coprocessor 4 according to the prior art.

The circuit illustrated in FIG. 1 includes:

three shift registers 10, 11 and 12 with series input and output, these registers having a number n of cells, with $n=m*k$.

multiplexers 13, 14 and 15 placed respectively before the registers 10, 11 and 12.

three registers 16, 17 and 18 with series input and parallel output;

two multiplication circuits 19 and 20, including one series input, one parallel input and one series output;

two registers 21 and 22 with k cells;

multiplexers 24, 25, 26, 36, 37 and 38;

a demultiplexer 39;

series subtraction circuits 27, 28 and 29;

series addition circuits 30 and 31;

delay cells 32, 33 and 34 to delay the propagation of pieces of binary data by k cycle periods;

a comparison circuit 35.

For further details on the arrangement of the different elements of the circuit with respect to one another, reference may be made to the document D2 and especially to FIGS. 2 and 3, and to the extracts from the description pertaining thereto: page 15, line 54 to page 16, line 13, and page 17, line 50 to page 18, line 55.

Figure 2:
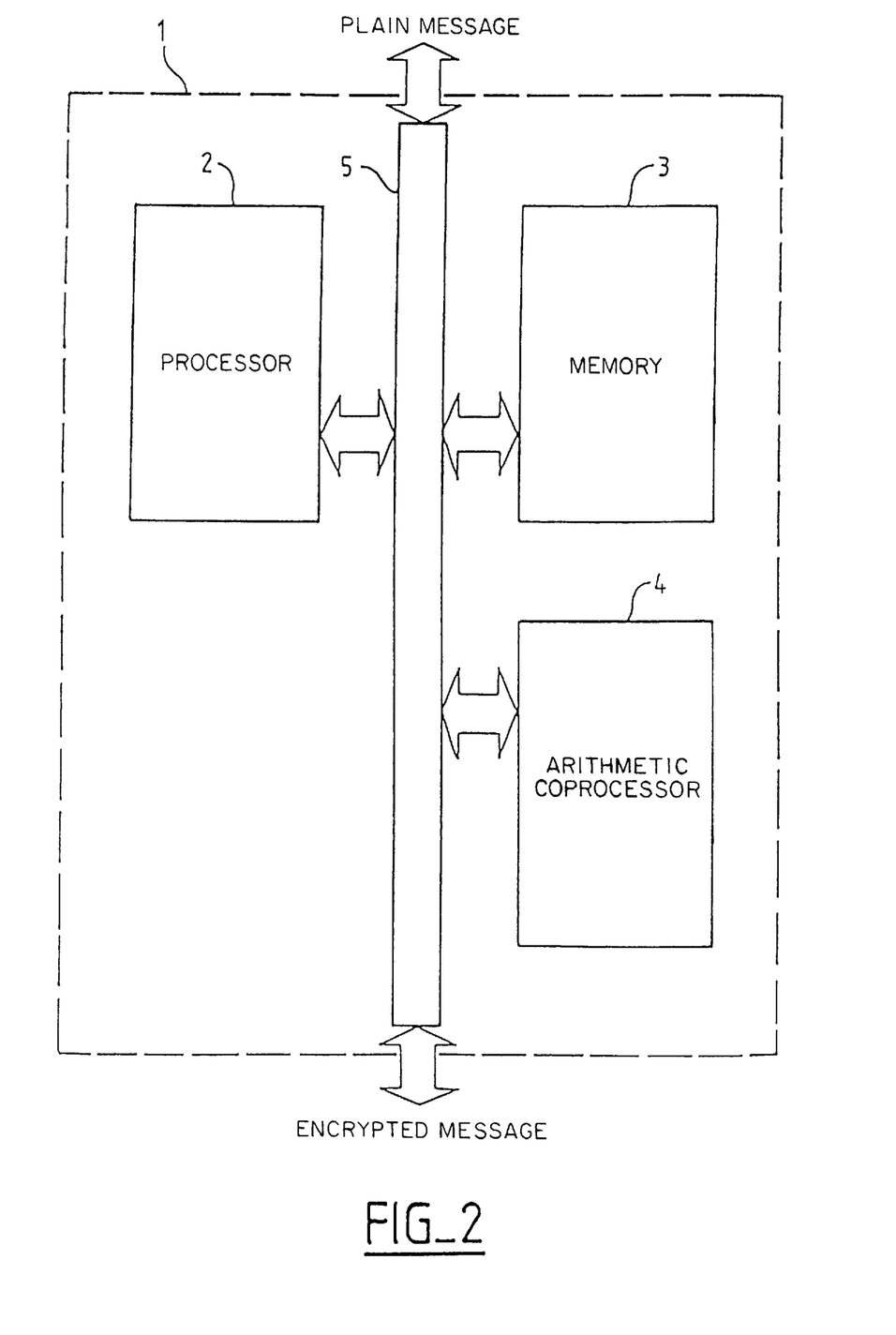
FIG. 2 shows a typical example of a structure of a circuit comprising a coprocessor.

The use of the circuit illustrated in FIG. 2 to carry out a $P_{field}(A,B)_N$ operation where A, B, and N are encoded on n bits in m words of k bits, N is an odd number and A is subdivided into m words $A_{i-1}$ (with i as an integer index varying from 1 to m), includes the following steps:

1—Initialization of the Circuit the software computation of a parameter $J_0$ defined by the relationship:

$$[(N*J_0)+1] \bmod 2^k = 0$$

the serial loading of the parameter $J_0$ into the register 17,
the serial loading of B into the register 10,
the serial loading of N into the register 12,
the serial loading of $A_0$ into the register 16,
the serial loading of n consecutive logic zeros into the register 11,
the initialization of the two multiplication circuits 19 and 20, the three subtraction circuits 27, 28 and 29, and the two addition circuits 30 and 31.

2—The Setting Up of a Loop Indexed by i with i Varying from 1 to m the parallel loading into the register 21 of the contents of the register 16, the performance of different elementary operations in order to perform the following computations:

$X(i)=S(i-1)+B*A_{i-1}$ $Y_0(i)=[X(i)*J_0] \bmod 2^k$ $Z(i)=X(i)+[N*Y_0(i)]$ $S(i)=Z/2^k$, / being the integer division, subtraction, during the following iteration, of N or 0 from S depending on whether S is greater than N or not.

3—The Output of the Result S(k) by Means of an Output Terminal

For further details on the running of a method of this kind, reference may be made to the document D2 and more particularly to the following extracts: page 4—line 41 to page 6—line 17 and page 19—lines 7 to 49.

Now, the use of the circuit shown in FIG. 1 can be used to improve processing operations (in terms of computation time, memory size, etc.) for modular operations using a fixed data size, in this case 256 or 512 bits (depending on whether m is equal to 8 or 16). Now, cryptography requires increasingly efficient machines working at ever-higher speeds and using ever-more complex keys. The trend is towards the handling of pieces of data encoded on 768 or even 1024 bits. To process pieces of data of this kind, it is possible to envisage the use of larger-sized circuits by adapting the elements of the circuit to the size of the pieces of data. This approach may raise problems in applications such as smart card applications for which the size of the card is physically limited because of the differences in flexibility between the cards and the silicon substrate. Furthermore, there is a demand for the integration of increasing numbers of different functional elements on a card of this kind, and the place available for an encryption circuit is thereby further reduced. It is therefore necessary to find solutions with which to limit the increase in the size of this circuit while at the same time enabling optimum operation for pieces of data whose size is greater than the size of the originally planned registers. This problem is not limited to modular arithmetic coprocessors that process pieces of data with a fixed size of 256 or 512 bits. It can also be transposed more generally to data-handling coprocessors that need to be used for operations on data whose size exceeds their processing capacity.

If it is desired to carry out modular operations using operands with a size greater than what is managed by the coprocessor (namely in practice greater than the size of the registers), it is possible to use a standard processor (with 8, 16 or 32 bits), a memory and the coprocessor of FIG. 1, the coprocessor being used to perform operations of multiplication.

It is possible, with the processor described in D2, to carry out standard operations of multiplication A*B on sizes of up to n bits by means of the following procedure.

1—Initialization the loading of k logic zeros into the register 17, the loading of B into the register 10, the loading of n logic zeros into the register 11, the loading of the word $A_0$ of k bits of A into the register 16, the initialization of the multiplier 19, the initialization of the addition and subtraction circuits 28, 30 and 31.

2—The Setting up of a Computation Loop with i as an Index Varying from 1 to m the loading of the contents of the register 16 into the register 21, the performance, by a simultaneous rightward shift of the registers 10 and 11, of the multiplication of $A_{i-1}$ by B and the addition of the contents of the register 11 with the result of the product, the storage of the k least significant bits of the result into the register 12 by a k-bit rightward shift, the storage of the n most significant bits of the result into the register 11, the loading of the word $A_i$ into the register 16 (preferably during the running of one or more of the preceding steps).

At the end of a method such as this, there is therefore the least significant bits of the result in the register 12 and the most significant bits of the result in the register 11. All that needs to be done is to add an output terminal connected to the output of the registers 11 and 12 to be able to recover the result at the output of the coprocessor.

It is possible to perform the multiplication of a piece of data B encoded on n bits by means of a piece of data A encoded on m' words with m' as an integer greater than m. For this purpose, the loop is done with i varying from 1 to m'. At every m iterations, the contents of the register 12 are output by an output terminal.

Since the coprocessor can be used to carry out standard operations of multiplication, it is possible to perform modular operations on operands encoded on a number m'*k bits with m'>m. For this purpose, the operands A, B and N are manipulated by being divided into q (q as an integer) sub-operands of n bits: $A_{q-1}, A_{q-2} \ldots A_0, B_{q-1}, B_{q-2} \ldots B_0, N_{q-1}, N_{q-2} \ldots N_0$. The coprocessor is used to perform standard operations of multiplication on the sub-operand.

The following method is used:

1.1—Multiplication of B by the First Sub-operand of A

1—Computation of $A_0*B_0$.

The result has the form $R_{10} R_{00}$ with $R_{10}$ and $R_{00}$ being pieces of data encoded on n bits. $R_{10}$ and $R_{00}$ are output from the registers 11 and 12 and they are stored in a memory.

2—Computation of $A_0*B_1$.

The result has the form $R_{11} R_{01}$ with $R_{11}$ and $R_{01}$ encoded on n bits.

$R_{11}$ and $R_{01}$ are output from the registers 11 and 12 and they are stored in a memory.

Q—Computation of $A_{00}*B_{q-1}$.

The result has the form $R_{1q-1} R_{0q-1}$ with $R_{1q-1}$ and $R_{0q-1}$ encoded on n bits.

$R_{1q-1}$ and $R_{0q-1}$ are output from the registers 11 and 12 and they are stored in a memory.

1.2—Computation of the Result of the Multiplication of B by the First Sub-operand of A computation of $R_{10}+R_{01}$ and storage of the result referenced $X_1$, computation of $c_1+R_{11}+R_{02}$ ($c_1$ being the carry value of the previous calculation) and storage of the result referenced $X_2$, computation of $c_{q-2}+R_{1q-2}+R_{0q-1}$ and storage of the result referenced $X_{q-1}$, computation of $c_{q-1}+R_{1q-1}$ and storage of the result referenced $X_q$.

If it is assumed that $R_{00}=X_0$, then the result of the multiplication is the piece of data $X_q X_{q-1} \ldots X_1 X_0$.

It is of course possible to perform the addition operations as and when the results are output. This makes it possible to minimize the size of the memory in which the results are stored.

1.3—Computation of the Result of a Multiplication $X_0*J_0=Y$ with Y having the form $Y_1 Y_0$, $Y_1$ and $Y_0$ being encoded on n bits, output and storage of $Y_0$.

1.4—Computation of the Result of the Multiplication of the First Sub-operand of Y by N 1—Computation of $Y_0*N_0$.

The result has the form $T_{10} T_{00}$ with $T_{10}$ and $T_{00}$ being encoded on n bits.

$T_{10}$ and $T_{00}$ are output from the registers 11 and 12 and they are stored in a memory.

2—Computation of $Y_0*B_1$.

The result has the form $T_{11} T_{01}$ with $T_{11}$ and $T_{01}$ encoded on n bits.

$T_{11}$ and $T_{01}$ are output from the registers 11 and 12 and they are stored in a memory.

Q—Computation of $Y_0*N_{q-1}$.

The result has the form $T_{1q-1} T_{0q-1}$ with $T_{1q-1}$ and $T_{0q-1}$ encoded on n bits.

$T_{1q-1}$ and $T_{0q-1}$ are output from the registers 11 and 12 and they are stored in a memory. 1.5—Computation of the Result of the Multiplication of N by the First Sub-operand of Y computation of $T_{10}+T_{01}$ and storage of the result referenced $U_1$, computation of $c_1+T_{11}+T_{02}$ ($c_1$ being the carry value of the previous computation) and storage of the result referenced $U_2$, computation of $c_{q-2}+T_{1q-2}+T_{0q-1}$ and storage of the result referenced $U_{q-1}$, computation of $c_{q-1}+T_{1q-1}$ and storage of the result referenced $U_q$.

If it is assumed that $T_{00}=U_0$, then the result of the multiplication is the piece of data $U_q\ U_{q-1}\ \ldots\ U_1\ U_0$.

It is of course possible to perform the addition operations as and when the results are output. This makes it possible to reduce the size of the memory in which the results are stored.

1.6—Computation of the Result of the Modular Multiplication of B by the First Sub-operand of A Computation of U+X and storage of the result, referenced Z.

The result Z of the addition has the form (c) $Z_q\ Z_{q-1}\ \ldots\ Z_1\ Z_0$.

storage of $S(1)=Z/2^k-($N or $0)$.

2—Resumption of the Steps 1.1 to 1.6 in Considering the Second Sub-operand of A by Modifying the Step 1.2 as Here Below computation of $R_{10}+R_{01}$ and storage of the result referenced $W_1$, computation of $c_1+R_{11}+R_{02}$ ($c_1$ being the carry value of the previous calculation) and storage of the result referenced $W_2$, computation of $c_{q-2}+R_{1q-2}+R_{0q-1}$ and storage of the result referenced $W_{q-1}$, computation of $c_{q-1}+R_{1q-1}$ and storage of the result referenced $W_q$.

Then:

computation of W+S(1) which then gives the result of the multiplication X with X having the form $X_q\ X_{q-1}\ \ldots\ X_1\ X_0$ and $W=W_q\ W_{q-1}\ \ldots\ W_1\ W_0$ with $W_0=R_{00}$.

Q—Resumption of the Above Steps in Taking into Consideration the $q^{th}$ Sub-operand of A The final result of the computation is $S(q)-($N or $0)$.

As can be seen, the method requires a certain number of exchanges with the exterior. These exchanges entail penalties in terms of computation time and memory space to store, firstly, a part of the result extracted from the coprocessor and, secondly, the executable program corresponding to the method which is complex. Generally, the value of the coprocessors is that they use a faster clock frequency than that of the other elements that are connected to them. Hence, the value of using a coprocessor is minimized if the processing operations for which it is designed involve exchanges with circuits (standard processors, memories, etc.) that work more slowly, namely circuits to whose speeds they have to adapt during the exchanges.

The inventor has sought to modify the coprocessor illustrated in FIG. 1 so as to improve the processing of the above operation, and more particularly so as to reduce the processing time.

SUMMARY OF THE INVENTION

Thus, the invention relates to a device comprising a first register, a second register and a third register, at least one input terminal to receive pieces of binary data to be stored in these registers, a multiplication circuit enabling the performance of a multiplication operation between two pieces of data stored in the first and third registers, a first addition circuit enabling the performance of an addition operation between a piece of data stored in the second register and a piece of data produced by the multiplication circuit, a subtraction circuit placed between the second register and the addition circuit enabling the performance of a subtraction operation between a piece of data stored in the second register and a piece of data stored in a fourth register, a delay cell and a second addition circuit placed between the first addition circuit and the input of the second register, and multiplexing means making it possible to provide the contents of the second register or a permanent logic state to one input of one of the addition circuits, to connect another input of the addition circuit to an output of the multiplication circuit and to connect an output of the addition circuit to an input of the second register.

BRIEF DESCRIPTION OF THE DRAWINGS

The invention will be understood more clearly and other particular features and advantages shall appear from the following description, made with reference to the appended drawings, of which.

DETAILED DESCRIPTION

Figure 4:
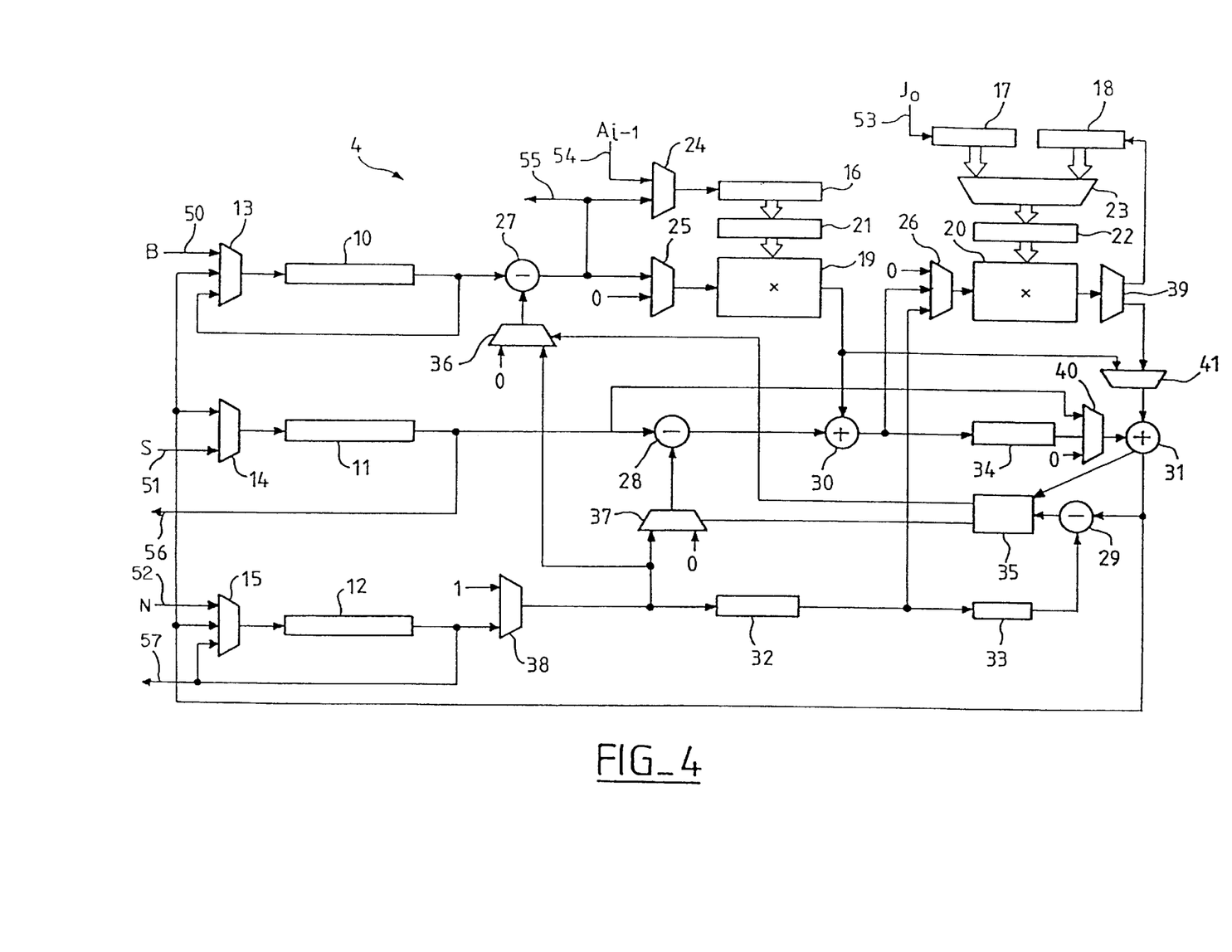
Figure 5:
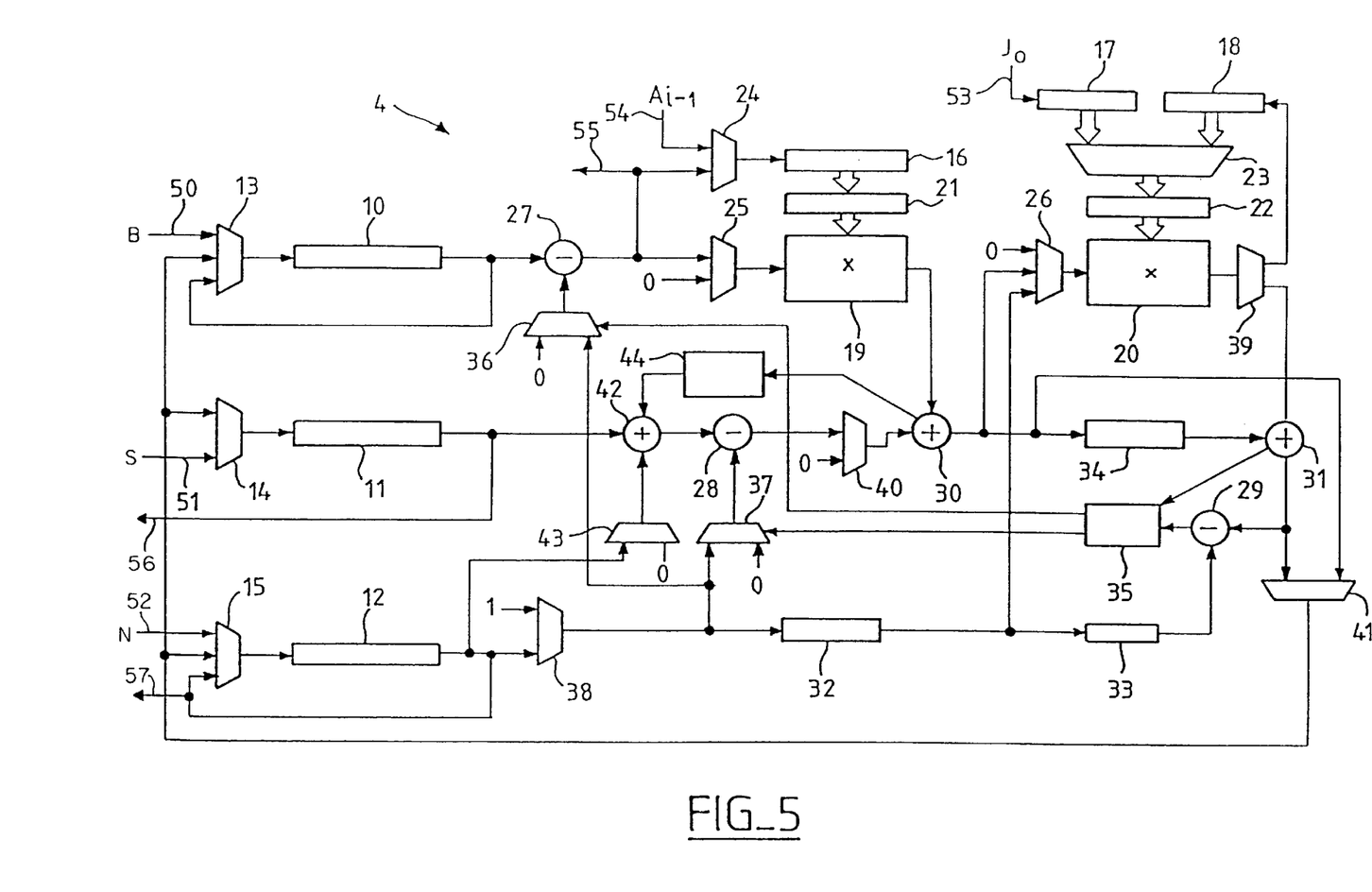

FIG. 2 shows an encryption circuit 1 comprising a processor 2 (for example an 8-bit, 16-bit or 32-bit processor), a memory 3, a coprocessor 4 and a communication bus 5. The bus 5 is used to connect the elements 2, 3 and 4 together and/or to the exterior of the circuit 1 in order to exchange pieces of data and/or control signals. The memory is used to store pieces of binary data having different formats. The processor 2 is used to manage the information exchanges between the memory 3, the coprocessor 4 and the exterior. The coprocessor is a modified version of the coprocessor shown in FIG. 1 as illustrated in FIGS. 3, 4 and 5.

Figure 3:
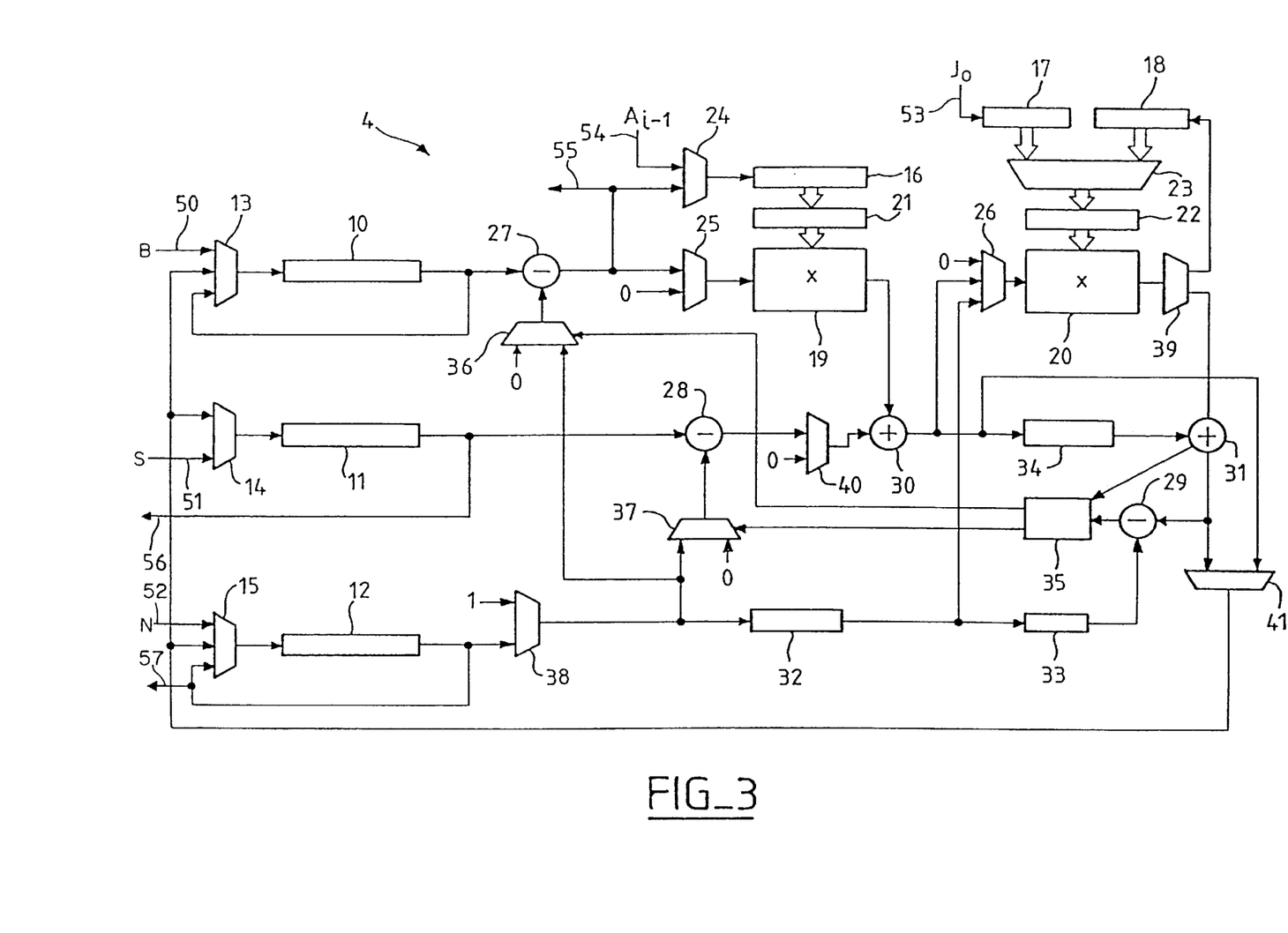
FIGS. 3, 4 and 5 show coprocessors according to the invention.

FIG. 3 shows a coprocessor according to the invention.

The circuit shown in FIG. 3 comprises:

three shift registers 10, 11 and 12 with series input and series output. These registers have a number n (with n as an integer) of cells, with n=m*k (m and k as integers), a multiplexer 13 comprising three series inputs and one series output, the series output being connected to the input of the register 10, the first input being connected to a first input terminal 50, the second input being connected to the output of the register 10, a multiplexer 14 comprising two series inputs and one series output, the series output being connected to the input of the register 11, the first input being connected to a second input terminal 51, a multiplexer 15 comprising three series inputs and one series output, the series output being connected to the input of the register 12, the first input being connected to a third input terminal 52, the second input being connected to the output of the register 12, three k-cell registers 16, 17 and 18 comprising a series input and a parallel output, the input of the register 17 being connected to a fourth input terminal 53, two multiplication circuits 19 and 20 comprising a series input, a parallel input receiving k bits and a series output, two k-bit storage registers 21 and 22 comprising a parallel input and output, the input of the register 21 being connected to the output of the register 16, the output of the register 21 being connected to the parallel input of the multiplication circuit 19 and the output of the register 22 being connected to the parallel input of the multiplication circuit 20, a multiplexer 23 comprising two parallel inputs and one parallel output, the first input of the multiplexer 23 being connected to the output of the register 17, the second input of the multiplexer 23 being connected to the output of the register 18, the output of the multiplexer 23 being connected to the input of the register 22, two multiplexers 24 and 25, each having two series inputs and one series output, the output of the multiplexer 24 being connected to the input of the register 16, the first input of the multiplexer 24 being connected to a fifth input terminal 54, the output of the multiplexer 25 being connected to the series input of the multiplication circuit 19, the first input of the multiplexer 25 being connected to a logic zero, a multiplexer 26 comprising three series inputs and one series output, the output being connected to the series input of the multiplication circuit 20, the first input being connected to a logic zero, subtraction circuits 27, 28 and 29 each comprising two series inputs and one series output, the first input of the circuit 27 being connected to the output of the register 10, the output of the circuit 27 being connected to each of the second inputs of the multiplexers 24 and 25 and also to an output terminal 55, the first input of the circuit 28 being connected to the output of the register 11, addition circuits 30 and 31 each comprising two series inputs and one series output, the first input of the circuit 30 being connected to the output of the circuit 19, the output of the circuit 30 being connected to the second input of the multiplexer 26, the output of the circuit 31 being connected to the first input of the circuit 29, delay cells 32, 33 and 34 for the delaying, by k cycle periods, of the propagation of pieces of binary data (these cells being typically k-bit shift registers), these cells comprising one series input and one series output, the output of the cell 32 being connected firstly to the third input of the multiplexer 26 and secondly to the input of the cell 33, the output of the cell 33 being connected to the second input of the circuit 29, the input of the cell 34 being connected to the output of the circuit 30 and the output of the cell 34 being connected to the first input of the circuit 31, a comparison circuit 35 comprising two series inputs and two outputs, the first input being connected to the output of the circuit 31, the second input being connected to the output of the circuit 29, two multiplexers 36 and 37, each comprising two series inputs, one selection input and one series output, each of the first inputs being connected to a logic zero, each of the selection inputs being connected to one of the outputs of the circuit 35, the output of the multiplexer 36 being connected to the second input of the circuit 27, the output of the multiplexer 37 being connected to the second input of the circuit 28, a multiplexer 38 comprising two series inputs and one series output, the first input being connected to a logic "one", the second input being connected to the output of the register 12, the output being connected firstly to the input of the cell 32 and secondly to the second inputs of the multiplexer 36 and 37, a demultiplexer 39 comprising a series input and two series outputs, the input being connected to the output of the circuit 20, the outputs being connected respectively to the input of the register 18 and to the second input of the circuit 31, a multiplexer 40 comprising two series inputs and one series output, the first input being connected to the output of the circuit 28, the second input being connected to a logic zero and the output being connected to the second input of the circuit 30, a multiplexer 41 comprising two series inputs and one series output, the first input being connected to the output of the circuit 30, the second input being connected to the output of the circuit 31, and the output being connected to the third inputs of the multiplexers 13 and 15 and to the second input of the multiplexer 14, two output terminals 56 and 57 respectively connected to the outputs of the registers 11 and 12.

With regard to the output and input terminals, it could be chosen to use distinct terminals but these could also be one or more input/output terminals common to several elements of the circuit. One advantage in using distinct terminals is that it is possible to receive and/or give pieces of data from and/or to elements external to the coprocessor (such as the processor 2 for example) simultaneously, thus reducing the period of the exchanges between the circuit and the external elements.

Furthermore, with regard to the elements of the circuit 4, the above description must also be understood as being a description that is more functional than structural. In other words, it is important to be able to make the connections as indicated between the elements fulfilling the functions listed (multiplexing, addition, subtraction, etc.). In particular, the multiplexers could be combined with one another and then have a greater number of inputs, outputs and selection inputs. With regard to the multiplexers 25, 36, 37 and 40 which have an input receiving a fixed signal (a logic zero or logic one), it is possible to incorporate them functionally into the circuits 19, 27, 28 and 30 if these circuits include a control input enabling a logic state to be imposed on one of their inputs.

As compared with the circuit of FIG. 1, the circuit of FIG. 3 therefore has two additional multiplexers 40 and 41 and the multiplexer 14 has its first input connected to an input terminal. The multiplexer 40 enables the second input of the addition circuit 30 to be set at zero independently of the contents of the register 11. The multiplexer 41 enables the output of the circuit 30 to be connected directly to the inputs of the registers 10, 11 and 12, thus enabling the simple performance of a non-modular operation A*B+C. The result is not delayed in the cell 34, unlike in the circuit shown in FIG. 1. Furthermore, the invention does away with the need to take account of the circuits 20 and 31 which implies that to carry out a standard multiplication, in the case of the circuit of FIG. 1, it is necessary to perform a modular operation in assuming that $J_0=0$. It is possible, through the invention, to perform a non-modular multiplication without taking account of the elements of the circuit 4 used in the context of a Pfield operation. It is therefore possible, in a case of this kind, to consider limiting the consumption of the circuit 4 by inhibiting the operation of the elements that are used solely in the context of a Pfield operation.

It will be noted that the multiplexer 40 could have been placed between the output of the register 11 and the first input of the circuit 28.

It would also be possible to use a three-input multiplexer 40, the third input being connected to the output of the register 11. Through this approach, it becomes possible to remove the need for the presence of the circuit 28. It is then possible to reduce the total power consumption of the circuit 4 by arranging to isolate this circuit, and any other circuits (such as the multiplexer 37) that may be functionally attached to it, when the circuit 28 is not used.

The coprocessor illustrated in FIG. 3 can be used, through the addition of the elements 40 and 41, to carry out Pfield operations on operands encoded on a number m'*k bits with m'>m, more simply and more speedily than in the case of the circuit of FIG. 1. For this purpose, the operands A, B and N are manipulated by dividing them into q (with q as an integer) sub-operands of n bits: $A_{q-1} A_{q-2} \ldots A_0, B_{q-2} \ldots B_0, N_{q-1} N_{q-2} \ldots N_0$. It will be noted that, in practice, A and B could have different sizes. It is assumed here, to simplify the description, that A and B have the same size. The detailed step-by-step operation of the elements of the coprocessor shall not be described in detail as this operation raises no problems for those skilled in the art who know the document D2.

The method is as follows:

1.1—The Multiplication of B by the First Sub-operand of A 1—Computation of $A_0 * B_0$.

The result has the form $R_{10} R_{00}$ with $R_{10}$ and $R_{00}$ being pieces of data encoded on n bits.

$R_{00}=X_0$ is output from the register 12 and it is stored in a memory (for example the memory 3 of the circuit 2)

2—Computation of $A_0 * B_1 + R_{10}$.

The result has the form $R_{11} R_{01}$ with $R_{11}$ and $R_{01}$ encoded on n bits.

$R_{01}=R_{x1}$ is output from the register 12 and it is stored in a memory.

Q—Computation of $A_0 * B_{q-1} + R_{1q-1}$.

The result has the form $R_{1q-1} R_{0q-1}$ with $R_{1q-1}$ and $R_{0q-1}$ encoded on n bits.

$R_{1q-1}=X_q$ and $R_{0q-1}=X_{q-1}$ are output from the registers 11 and 12 and they are stored in a memory.

The result of the multiplication is the piece of data $X_q, X_{q-1} \ldots X_1 X_0$.

1.2—The Computation of the Result of a Multiplication $X_0 * J_0 = Y$ with Y having the form $Y_1 Y_0$, $Y_1$ and $Y_0$ being encoded on n bits, output and storage of $Y_0$.

1.3—The Computation of the Result of the Multiplication of the First Sub-operand of Y by N 1—Computation of $Y_0 * N_0 + X_0$.

The result has the form $T_{10} T_{00}$ with $T_{10}$ and $T_{00}$ being encoded on n bits.

$T_{00}=Z_0$ is output from the register 12 and it is stored in a memory.

In practice, it can be shown that $Z_0=0$, and it is therefore not necessary to memorize it.

2—Computation of $Y_0 * N_1 + T_{10}$.

The result has the form $T_{11} T_{01}$ with $T_{11}$ and $T_{01}$ encoded on n bits.

$T_{01}=U_1$ is output from the register 12 and it is stored in a memory.

Q—Computation of $Y_0 * N_{q-1} + T_{1q-2}$.

The result has the form $T_{1q-1} T_{0q-1}$ with $T_{1q-1}$ and $T_{0q-1}$ encoded on n bits.

$T_{1q-1}=U_q$ and $T_{0q-1}=U_{q-1}$ are output from the registers 11 and 12 and they are stored in a memory.

The result of the multiplication is the piece of data $U_q U_{q-1} \ldots U_1 U_0$.

1.4—The Computation of the Result of the Modular Multiplication of B by the First Sub-operand of A computation of U+X and storage of the result referenced Z.

The result Z of the addition has the form (c) $Z_q Z_{q-1} \ldots Z_1 Z_0$.

storage of $S(1)=Z/2^k-(N \text{ or } 0)$.

2—Resumption of the Steps 1.1 to 1.4 in Considering the Second Sub-operand of A by Modifying the Step 1.1 as Here Below 1—Computation of $A_0 * B_0 + 0$.

The result has the form $R_{10} R_{00}$ with $R_{10}$ and $R_{00}$ being pieces of data encoded on n bits.

$R_{00}=W_0$ is output from the register 12 and it is stored in a memory (for example the memory 3 of the circuit 1)

2—Computation of $A_0 * B_1 + R_{10}$.

The result has the form $R_{11} R_{01}$ with $R_{11}$ and $R_{01}$ encoded on n bits.

$R_{01}=W_1$ is output from the register 12 and it is stored in a memory.

Q—Computation of $A_1 * B_{q-1} + R_{1q-1}$.

The result has the form $R_{1q-1} R_{0q-1}$ with $R_{1q-1}$ and $R_{0q-1}$ encoded on n bits.

$R_{1q-1}=W_q$ and $R_{0q-1}=W_{q-1}$ are output from the registers 11 and 12 and they are stored in a memory.

The computation of W+S(1) which then gives the result of the multiplication X with X having the form $X_q X_{q-1} \ldots X_1 X_0$ Q—Resumption of the Above Steps in Taking into Consideration the $q^{th}$ Sub-operand of A The final result of the computation is $S(q)-(N \text{ or } 0)$.

Gain in Computation Time

The computation time is measured in terms of number of clock cycles of the coprocessor.

The multiplication of the contents of the register 10 by the contents of the register 16 requires (n+2.k) cycles (in not taking account of the loading of the registers and the initializing of the circuit) with the prior art circuit, and (n+k) cycles with the circuit of the invention, the cell 34 being not used. It is furthermore assumed that the additions are performed by means of a series adder for which the rate of the operation is set by the clock of the coprocessor. One addition then requires n cycles.

Method according to the prior art

Computation of the $A_i * B$: $q.q.m (n+2.k)=n.q^2.(m+2)$

Computation of the W: $q.q.n=n.q^2$

Computation of the X: $(q-1).(q+1).n=n.(q^2-1)$

Computation of the Y: $q.m.(n+2.k)=n.q.(m+2)$

Computation of the T: $q.q.m.(n+2.k)=n.q^2.(m+2)$

Computation of the U: $q.q.n=n.q^2$

Computation of the Z: $q.(q+1).n=n.(q^2+q)$

The number of cycles needed to perform the computations is given by the following formula:

$$2.n.(m+4).q^2+n.(m+3).q-n.$$

Method using the Invention

Computation of the $A*B+R$: $q.q.m (n+k)=n.(m+1).q^2$

Computation of the X: $(q-1).(q+1).n=n.q^2-n$

Computation of the Y: $q.m.(n+k)=n.(m+1).q$

Computation of the T: $q.q.m.(n+k)=n.(m+1).q^2$

Computation of the Z: $q.(q+1).n=n.q^2+n.q$

The number of cycles needed to perform the computations is given by the following formula:

$$2.n.(m+2).q^2+n.(m+2).q-n.$$

Let it be assumed that q=3 and k=32.

For m=8 (n=256), the first method requires 63,488 cycles and the second method requires 53,504 cycles, giving a gain of 15.72%.

For m=16 (n=512), the first method requires 212,992 cycles and the second method requires 193,024 cycles, giving a gain of 9.38%.

It will be observed that these computations do not take account of the exchanges of data between the coprocessor and the exterior, these exchanges being far more numerous in the layout of the first method. The time needed to perform these exchanges depends on the clock frequency used to set the rate of operation of the external elements (such as the processor 2, the memory 3 and the communication bus 5 of the circuit 1), this frequency being in practice generally lower than the clock frequency of the coprocessor.

The capacity of the coprocessor according to the invention to implement operations of the A*B+C type also has other advantages.

RSA Method

The RSA encryption method makes it necessary to perform computations of the $C=M^D$ mod N type with M as a message to be encrypted or decrypted, N as a modulo value such that N=P* Q, with P and Q being prime integers and D such that (D*E) mod [(P−1)*(Q−1)]=1, with E as a known quantity.

An algorithm to perform this computation is the following:

$A=(M \bmod P)^{D \bmod (P-1)} \bmod P$
$B=(M \bmod Q)^{D \bmod (Q-1)} \bmod Q$
$U=Q^{-1} \bmod P$
If A<B mod P then
C=[[(A+P−(B mod P))*U] mod P]*Q+B
Else
C=[[(A−(B mod P))*U] mod P]*Q+B The invention can be used to compute C which has the form X*Q+B by loading B into the register 11. It will be noted that in this respect that it is particularly useful to provide for a multiplexer 14 having one input connected to an input terminal of the circuit. Indeed, in the method explained here above dealing with multiplication for data of a size greater than that of the registers, the contents of the register 11 are produced within the circuit. An input terminal is therefore not used in this case to load the contents of the register 11. If it is desired to compute A*B+C, with C having any value, it should be possible to enter the piece of data C into the register 11 by connecting one input of the multiplexer to an input terminal.

Pfield Operation with Overflow of Capacity

In practice, the operation of the coprocessor is controlled by a sequencing circuit which controls the different elements of the coprocessor according to the operation to be performed. Typically, this sequencing circuit comprises counters and/or reverse counters assigned to the control of the computation loops and to the control of the operation within the loops.

The number of passages in the register 16, for a given operation, is fixed by the size of the operand A. With the size of the operand being known, it is possible to increment a counter at the rate of the passages and to compare the value of the counter with the number of necessary passages in such a way that the coprocessor is stopped when the operation is finished. A problem may arise if the value of counting representing the size of the operand is greater than the counting capacity of the counter.

Assuming for example that it is sought to perform $P_{field}(A, B)_N$ with A encoded on m"*k bits, the counting capacity of the counter being m'*k bits with m' lower than m". The operation can be performed with the circuit shown in FIG. 3. First of all the Pfield operation is performed with the m' first blocks of A and the result is stored in the register 11. It is then enough to restart the operation with the (m"−m') last blocks of A, the contents of the register 11 being added, during the first multiplication, to the piece of data produced by the circuit 19. This makes it necessary to know the state of only one control signal indicating the input of the multiplexer 40 to be selected.

Given the way in which the prior art circuit works, this method is not possible. Indeed, the implementation of a Pfield operation includes the automatic loading into the register 11 of logic zeros. In other words, the problem of capacity overflow must be dealt with externally: this is detrimental in terms of computation time and memory space (it is necessary to store the appropriate program).

FIG. 4 illustrates another coprocessor 4 according to the invention. It comprises the same elements as the circuits shown in FIG. 3. The multiplexers 40 and 41 are positioned otherwise. The addition circuit 31 is used instead of the addition circuit 30.

The multiplexer 40 comprises three series inputs and one series output. The first input of this multiplexer 40 is connected to the first input of the circuit 28. The output of the circuit 28 is connected to the second input of the circuit 30 in a manner similar to that of the circuit 4 illustrated in FIG. 1. The second input of the multiplexer 40 is connected to the output of the cell 34 (this output being no longer connected to the first input of the circuit 31). The third input of the multiplexer 40 is connected to a logic zero. The output of the multiplexer 40 is connected to the first input of the circuit 31.

The multiplexer 41 has two series inputs and one series output. The first input of this multiplexer 41 is connected to the output of the circuit 19. The second input of the multiplexer 41 is connected to the second output of the demultiplexer 39 (which is no longer connected to the second input of the circuit 31). The output of the multiplexer 41 is connected to the second input of the circuit 31. As for the output of the circuit 31, it is connected to the inputs of the multiplexers 13, 14 and 15 as shown in FIG. 1.

It will be noted that the circuit illustrated in FIG. 4 is less flexible in its use than that of FIG. 3. With regard to the implementation of a non-modular operation A*B or A*B+C, the configuration shown in FIG. 4 is equivalent in terms of computation time and complexity to the configuration shown in FIG. 3. However, unlike the circuit of FIG. 3, it does not enable the implementation of modular operations. This is because the logic zero imposed on the third input of the multiplexer 40 is located downline with respect to the circuits 30 and 26. In other words, if it is necessary to consider a set of contents of the register 11 consisting of zeros, this register should be loaded in one way or another with said zeros. It is necessary either to add an input to the multiplexer 14 or to add a multiplexer upline with respect to the circuit 30, this multiplexer having the same role as the multiplexer 40 of the circuit shown in FIG. 3. In other words, the space requirement is then far greater for the circuit of FIG. 4 than it is for the circuit of FIG. 3, and its use is far more complicated. It will be observed that the first input of the multiplexer 40 of the circuit of FIG. 4 could have been connected to the output of the circuit 28.

FIG. 5 illustrates another coprocessor according to the invention. It has the same elements as the circuit shown in FIG. 3, these elements being arranged in the same way.

It furthermore comprises an addition circuit 42, a two-input multiplexer 43 and a carry value management circuit 44.

This circuit can be used to implement an A*B+C+D type operation with C and D being pieces of data stored in the registers 11 and 12 and A*B being produced by the multiplication circuit 19.

In the example shown in FIG. 5, the addition circuit 42 is positioned between the output of the register 11 and the subtraction circuit 28. The circuit 42 has two series inputs and one series output. Its series output is connected to the first input of the circuit 28. Its first input is connected to the output of the register 11 and its second input is connected to the output of the multiplexer 43. The multiplexer 43 has one input connected to the output of the register 12 and its other input receives a logic zero. The circuit 42 thus gives either the result of the addition of the contents of the registers 11 and 12 (C+D), or the contents of the register 11 (C+0).

It will be noted that the addition circuit could have been arranged differently, for example between the circuit 28 and the circuit 30, or even downline with respect to the circuit 30. The multiplexer 43 could be incorporated functionally with the circuit 42 if the latter includes one or more control inputs enabling the imposing of one or more logic states on its second input or on both inputs.

The function of the circuit 44 is to detect a possible overflow of capacity during intermediate operations. This overflow takes place if the addition of a piece of data with a piece of data given by the multiplication circuit 19 leads to a result encoded on a number of bits greater than the size of the pieces of data produced by the multiplication circuit 19 (i.e. practically the sum of the sizes of the registers 10 and 16). This may occur for example if the operations are performed on pieces of data encoded on a number of bits greater than n. This case, as shall be seen here below, may also occur for operations on pieces of data with a size equal to n. This circuit 44 detects the overflow in the addition circuit placed further downline (namely the circuit 30 in the example shown in FIG. 5), namely in the addition circuit that comes into action last in a computation loop. This is a question of the way in which the carry value is taken into account in the next computation loop, at one of the addition circuits (in the example this is the circuit 42).

The coprocessor shown in FIG. 5 can be used, by means of the addition of the elements 42, 43 and 44, to perform Pfield operations on operands encoded on a number m'*k bits with m'>m more simply and more speedily than in the case of the circuits of FIG. 1, 3 and 4. For this purpose, the operands A, B and N are manipulated by being divided into q (q as an integer) sub-operands with n bits: $A_{q-1}, A_{q-2} \ldots A_0, B_{q-1}, B_{q-2} \ldots B_0, N_{q-1}, N_{q-2} \ldots N_0$. It will be noted that A and B could, in practice, have different sizes. It is assumed here, to simplify the description, that A and B have the same size. The step-by-step operations of the elements of the coprocessor shall not be described in greater detail as they raise no problems for those skilled in the art having knowledge of the document D2.

The following is the method:

1.1—The Multiplication of B by the First Sub-operand of A

1—Computation of $A_0*B_0+0+0$.

The result has the form $R_{10} R_{00}$ with $R_{10}$ and $R_{00}$ being pieces of data encoded on n bits.

$R_{00}=X_0$ is output from the register 12 and it is stored in a memory (for example the memory 3 of the circuit 1)

2—Computation of $A_0*B_1+R_{10}+0$.

The result has the form $R_{11} R_{01}$ with $R_{11}$ and $R_{01}$ encoded on n bits.

$R_{01}=X_1$ is output from the register 12 and it is stored in a memory.

Q—Computation of $A_0*B_{q-1}+R_{1q-2}+0$.

The result has the form $R_{1q-1} R_{0q-1}$ with $R_{1q-1}$ and $R_{0q-1}$ encoded on n bits.

$R_{1q-1}=X_q$ and $R_{0q-1}=X_{q-1}$ are output from the registers 11 and 12 and they are stored in a memory.

The result of the multiplication is the piece of data $X_q$, $X_{q-1} \ldots X_1 X_0$.

In this step 1.1, the method is identical to the one implemented by the circuit of FIG. 3.

1.2—The Computation of the Result of a Multiplication $X_0*J_0=Y$ with Y having the form $Y_1 Y_0$, $Y_1$ and $Y_0$ being encoded on n bits, output and storage of $Y_0$.

1.3—The Computation of the Result of the Multiplication of the First Sub-operand of Y by N 1—Computation of $Y_0*N_0+X_0+0$.

The result has the form $T_{10} T_{00}$ with $T_{10}$ and $T_{00}$ being encoded on n bits.

$T_{00}=Z_0$ is output from the register 12 and it is stored in a memory.

2—Computation of $Y_0*N_1+X_1+T_{10}$.

The result has the form $T_{11} T_{01}$ with $T_{11}$ and $T_{01}$ encoded on n bits.

$T_{01}=Z_1$ is output from the register 12 and it is stored in a memory.

Q—Computation of $Y_0*N_{q-1}+X_{q-1}+T_{1q-2}$.

The result has the form $T_{1q-1} T_{0q-1}$ with $T_{1q-1}$ and $T_{0q-1}$ encoded on n bits.

$T_{1q-1}$ and $T_{0q-1}=Z_{q-1}$ are output from the registers 11 and 12 and they are stored in a memory.

$X_{q-1}+T_{1q-1}=Z_q$ is computed.

The result Z of the multiplication is the piece of data $Z_q$ $Z_{q-1} \ldots Z_1 Z_0$.

Storage of $S(1)=Z/2^k-(N \text{ or } 0)=S_q(1) S_{q-1}(1) \ldots S_1(1) S_0(1)$.

2—Resumption of the Steps 1.1 to 1.3 in Considering the Second Sub-operand of A by Modifying the Step 1.1 as Here Below 1) Computation of $A_0*B_0+S_0(1)+0$.

The result has the form $R_{10} R_{00}$ with $R_{10}$ and $R_{00}$ being pieces of data encoded on n bits.

$R_{00}=X_0$ is output from the register 12 and it is stored in a memory (for example the memory 3 of the circuit 1)

2) Computation of $A_0*B_1+S_1(1)+R_{10}$.

The result has the form $R_{11} R_{01}$ with $R_{11}$ and $R_{01}$ encoded on m words.

$R_{01}=X_1$ is output from the register 12 and it is stored in a memory.

Q) Computation of $A_1*B_{q-1}+S_{q-1}(1)+R_{1q-2}$.

The result has the form $R_{1q-1} R_{0q-1}$ with $R_{1q-1}$ and $R_{0q-1}$ encoded on n bits.

$R_{1q-1}$ and $R_{0q-1}=X_{q-1}$ are output from the registers 11 and 12 and they are stored in a memory.

Computation of $X_q=R_{1q-1}+S_q(1)$ which then gives the result of the multiplication X with X having the form $X_q X_{q-1} \ldots X_1 X_0$ Q—Resumption of the Above Steps in Taking into Consideration the $q^{th}$ Sub-operand of A The final result of the computation is S(q)−(N or 0).

The improvements shown in FIG. 5 can be used to obtain a gain in time, as compared with the circuit of FIG. 3, in the implementation of the sequences of operations, by increasing the number of operations performed simultaneously. This gain in time is achieved from the step 1.3 onwards.

Gain in computation time

The computation time is measured in terms of number of clock cycles of the coprocessor.

Computation of the $A*B+R+S$: $q.q.m(n+k)=n.(m+1).q^2$

Computation of the $X_q$: $(q-1).n=n.q-n$

Computation of the Y: $q.m.(n+k)=n.(m+1).q$

Computation of the $Y*N+T+X$: $q.q.m.(n+k)=n.(m+1).q^2$

Computation of the Zq: $q.n=n.q$

The number of cycles needed to perform the computations is given by the following formula:

$$2.n.(m+2).q^2+n.(m+2).q-n.$$

Let it be assumed that q=3 and k=32.

For m=8 (n=256), the prior art method requires 63,488 cycles and the above method requires 49,664 cycles, giving a gain of 21.77% (the gain was 15.72% for the circuit of FIG. 3).

For m=16 (n=512), the first method requires 212,992 cycles and the second method described here above requires 185,344 cycles, giving a gain of 12.98% (the gain was 9.38% for the circuit of FIG. 3).

It can therefore be seen that the additional gain in terms of computation time with respect to the circuit of FIG. 3 is in the range of 5% for m=8 and 3.5% for m=16.

In fact, the additional gain will be greater, for the computations of gain do not take account of the exchanges between the coprocessor and its environment.

Although we have considered the addition of the addition circuit 42 to the circuit of FIG. 3, it will be understood that it would have been equally possible to obtain this improvement by modifying the circuit shown in FIG. 4, the implementation of the operation A*B+C+D being then obtained with the addition circuit 31.

Illustration of Capacity Overflow

It shall be assumed, to simplify the description, that n is equal to 16 and k is equal to 8.

By way of an example, let it be assumed that it is desired to compute X=A*B+C+D, with A=FFFF, B=$B_1B_0$=FFFF with $B_0$=OOFF and $B_1$=FF00, C=FFFF and D=FFFF. A, B, C and D are therefore encoded on n bits.

The result X is FFFF FFFF, in other words it is encoded on 2.n bits. The final result of the operation can therefore be stored in two registers with a size n.

To carry out the operation, A will be stored in the register 10, $B_0$ and $B_1$ are stored successively in the register 16 and the final result X is stored in the registers 11 for the high-order bits and in the register 12 for the low-order bits.

The following procedure is used:

Step 1:

A*$B_0$+C+D=FFFF*FF+FFFF+FFFF
=FFFF*FF+01 FFFE
=FE FF01+01 FFFE
=100 FEFF

Z=00FE, encoded on n bits, is stored in the register 11.

FF (first half of the low order value of X) is stored in the first half of the register 12.

The carry value 1 is not stored in the register 11 and is added to the following step.

Step 2:

A*$B_1$+0+Z(+1)=FFFF*FF00+0000 FE00 (+100 0000)
=FFFF*FF00+0100 FE00
=FEFF 0100+0100 FE00
=FFFF FF00

The zeros in italics are shown so that there is mathematical consistency between the steps 1 and 2. In practice, they are not really present in the implementation of the loop of the step 2.

The multiplexer 43 is selected so as to permanently give the "zero" logic state at its output.

The high-order value of X (FFFF) is stored in the register 11 and the remainder of the low-order value of X (FF) is stored in the register 12, the first half of low order value of X being shifted towards the second half of the register 12. On the whole, we have FFFF in this register.

The final result is therefore really FFFF FFFF without overflow of the storage capacity of the register 11 during the shifting of the piece of data Z at the end of the first step in this register.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A device comprising:

a first register, a second register and a third register;

at least one input terminal to receive pieces of binary data to be stored in these registers;

a multiplication circuit which performs a multiplication operation between a piece of data stored in the first register and a piece of data stored in the third register;

a first addition circuit which performs an addition operation between a piece of data stored in the second register and a piece of data produced by the multiplication circuit;

a subtraction circuit placed between the second register and the addition circuit which performs a subtraction operation between a piece of data stored in the second register and a piece of data stored in a fourth register;

a delay cell and a second addition circuit placed between the first addition circuit and the input of the second register; and a multiplexing means which provides at an output the contents of the second register or a permanent logic state;

wherein one of the addition circuits receives the output of the multiplexing means at one input and receives an output of the multiplication circuit at another input, and the second register receives an output of said addition circuit at an input.

2. A device according to claim 1, wherein the multiplexing means comprise a first multiplexer and a second multiplexer, the first multiplexer having an input that receives a permanent logic state, an input connected to the output of the subtraction circuit, and an output connected to an input of the first addition circuit, the second multiplexer having an input connected to the output of the first addition circuit and an output connected to the input of the second register.

3. A device according to claim 2, wherein the first multiplexer comprises a third input connected to the output of the second register.

4. A device according to claim 1, wherein the multiplexing means comprise a first multiplexer and a second multiplexer, the first multiplexer having an input that receives a permanent logic state, an input connected to the output of the second register and an output connected to an input of the subtraction circuit, the second multiplexer having an input connected to the output of the first addition circuit and an output connected to the input of the second register.

5. A device according to claim 1, wherein the multiplexing means comprise a first multiplexer and a second multiplexer, the first multiplexer having an input that receives a permanent logic state, an input connected to the output of the second register and an output connected to a first input of the second addition circuit, the second multiplexer having an input connected to the output of the multiplication circuit and an output connected to a second input of the second addition circuit.

6. A device according to claim 5, wherein the first multiplexer has an input connected to an output of the delay cell.

7. A device according to claim 5, wherein the input of the second register is connected to the output of a multiplexer having one of its inputs that receives a permanent logic state.

8. A device according to claim 1, wherein the multiplexing means comprise a first multiplexer and a second multiplexer, the first multiplexer having an input that receives a permanent logic state, an input connected to the output of the subtraction circuit and an output connected to a first input of the second addition circuit, the second multiplexer having an input connected to the output of the multiplication circuit and an output connected to a second input of the second addition circuit.

9. A device according to claim 8, wherein the first multiplexer has an input connected to an output of the delay cell.

10. A device according to claim 8, wherein the input of the second register is connected to the output of a multiplexer having one of its inputs that receives a permanent logic state.

11. A device according to claim 1, wherein the input of the second register is connected to the output of a multiplexer having one of its inputs connected to an input terminal.

12. A device according to claim 1, comprising a third addition circuit which performs, in combination with the first and second addition circuits, an operation of addition between a piece of data stored in the second register, a piece of data stored in the fourth register, and the data produced by the multiplication circuit.

13. A device according to claim 12, comprising multiplexing means by which the contents of the fourth register or a permanent logic state can be provided to the third addition circuit.

14. A device according to claim 12, further comprising a carry value management circuit to detect when an overflow of capacity occurs during an intermediate operation, said overflow occurring when the intermediate operation produces a result encoded on a number of bits greater than the size of the pieces of data produced by the multiplication circuit, this overflow of capacity being taken into account during subsequent operations.

15. The device of claim 1, further comprising a processor, a memory, and a communication bus in combination.

16. A coprocessor circuit comprising:
   at least first and second registers;
   at least one input terminal coupled to these registers to receive binary data to be stored in these registers;
   a multiplication circuit which performs a multiplication operation with data from at least said first register;
   a first addition circuit which performs an addition operation between data stored in the second register and data produced by the multiplication circuit;
   a subtraction circuit disposed between the second register and the first addition circuit which performs a subtraction operation with data from at least said second register;
   a second addition circuit disposed between the first addition circuit and the input to the second register; and
   a multiplexing circuit coupled in the path of the addition circuits and having an output connected to the input of the second register,
   wherein the multiplexing circuit comprises a first multiplexer and a second multiplexer.

17. A coprocessor circuit according to claim 16 wherein said multiplexing circuit comprises a first multiplexer and a second multiplexer, the first multiplexer having an input that receives a permanent logic state, an input connected to the output of the subtraction circuit, and an output connected to an input of the first addition circuit.

18. A coprocessor circuit according to claim 17 wherein said second multiplexer has an input connected to the output of the first addition circuit and an output connected to the input of the second register.

19. A coprocessor circuit according to claim 18 wherein the first multiplexer comprises a third input connected to the output of the second register.

20. A coprocessor circuit according to claim 16 wherein the first multiplexer has an input that receives a permanent logic state, an input connected to the output of the second register and an output connected to an input of the subtraction circuit, the second multiplexer having an input connected to the output of the first addition circuit and an output connected to the input of the second register.

21. A coprocessor circuit according to claim 16 wherein the multiplexing circuit comprises a first multiplexer and a second multiplexer, the first multiplexer having an input that receives a permanent logic state, an input connected to the output of the second register and an output connected to a first input of the second addition circuit, the second multiplexer having an input connected to the output of a multiplication circuit and an output connected to a second input of the second addition circuit.

22. A coprocessor circuit according to claim 21, further including a delay cell and wherein the first multiplexer has an input connected to an output of the delay cell.

23. A coprocessor circuit according to claim 21 wherein the input of the second register is connected to an output of a multiplexer having one of its inputs that receives a permanent logic state.

24. A coprocessor circuit according to claim 16 wherein the multiplexing circuit comprises a first multiplexer and a second multiplexer, the first multiplexer having an input that receives a permanent logic state, an input connected to the output of the subtraction circuit and an output connected to a first input of the second addition circuit, the second multiplexer having an input connected to the output of the multiplication circuit and an output connected to a second input of the second addition circuit.

25. A coprocessor circuit according to claim 23, further including a delay cell and wherein the first multiplexer has an input connected to the output of the delay cell.

26. A coprocessor circuit according to claim 24 wherein the input of the second register is connected to an output of a multiplexer having one of its inputs that receives a permanent logic state.

27. A coprocessor circuit according to claim 16, wherein the input of the second register is connected to the output of a multiplexer having one of its inputs connected to an input terminal.

28. A coprocessor circuit according to claim 16, comprising a third addition circuit which performs, in combination with the first and second addition circuits, an operation of addition between at least the piece of data stored in at least the second register and the data produced by the multiplication circuit.

29. A coprocessor circuit according to claim 28, including a fourth register, wherein the operation of addition is performed between data stored in the second and fourth registers and the data produced by the multiplication circuit.

30. A coprocessor circuit according to claim 29, comprising multiplexing means that provides either the contents of the fourth register or a permanent logic state to the third addition circuit.

31. A coprocessor circuit according to claim 29, further comprising a carry value management circuit to detect when an overflow of capacity takes place during an intermediate operation, said overflow being when the intermediate operation produces a result encoded on a number of bits greater than a size of the pieces of data produced by the multiplication circuit, this overflow of capacity being taken into account during subsequent operations.

32. A coprocessor circuit according to claim 16, further comprising a processor, a memory, and a communication bus in combination.

* * * * *